(12) United States Patent
Liao et al.

(10) Patent No.: US 7,324,107 B2
(45) Date of Patent: Jan. 29, 2008

(54) SINGLE LEVEL MIP FILTERING ALGORITHM FOR ANISOTROPIC TEXTURING

(75) Inventors: Qun Feng (Fred) Liao, San Jose, CA (US); Zhou (Mike) Hong, Cupertino, CA (US)

(73) Assignee: Via Technologies, Inc., Hsien-Tien, Taipei (TW)

( * ) Notice: Subject to any disclaimer, the term of this patent is extended or adjusted under 35 U.S.C. 154(b) by 524 days.

(21) Appl. No.: 10/784,112

(22) Filed: Feb. 20, 2004
(Under 37 CFR 1.47)

(65) Prior Publication Data

US 2004/0257376 A1    Dec. 23, 2004

Related U.S. Application Data

(60) Provisional application No. 60/448,956, filed on Feb. 21, 2003.

(51) Int. Cl.
*G06T 17/00* (2006.01)
(52) U.S. Cl. ........................ 345/428; 345/587
(58) Field of Classification Search ............... None
See application file for complete search history.

(56) References Cited

U.S. PATENT DOCUMENTS

| | | | | |
|---|---|---|---|---|
| 5,740,344 A * | 4/1998 | Lin et al. | ............... | 345/587 |
| 6,184,894 B1 * | 2/2001 | Rosman et al. | ............... | 345/582 |
| 6,292,193 B1 * | 9/2001 | Perry et al. | ............... | 345/582 |
| 6,353,438 B1 * | 3/2002 | Van Hook et al. | ............... | 345/552 |
| 2001/0048443 A1 * | 12/2001 | Burrell | ............... | 345/582 |
| 2002/0126133 A1 * | 9/2002 | Ewins | ............... | 345/587 |
| 2004/0119720 A1 * | 6/2004 | Spangler | ............... | 345/583 |
| 2005/0128213 A1 * | 6/2005 | Barenbrug et al. | ............... | 345/587 |

OTHER PUBLICATIONS

Ewins, Jon "Mip-Map Level selection for Texture Mapping". Oct.-Dec. 1998, vol. 4, p. 317-329.*

* cited by examiner

*Primary Examiner*—Mark Zimmerman
*Assistant Examiner*—Kevin Xu
(74) *Attorney, Agent, or Firm*—Thomas, Kayden, Horstemeyer & Risley

(57) ABSTRACT

A method of performing anisotropic texture mip-mapping. The method includes determining a region of support for a set of target pixels of the image to be textured, and mapping the region of support to an area in texture map that is generally elliptical. For each axis of the ellipse the number of samples is determined and a filter function is performed on those samples to find the final color value. For four texels, the filter function is a weighted sum of the color values of each texel, where the weights are determined based on the fraction of the Level of Detail (LOD) and the fraction of the U or V coordinate.

16 Claims, 10 Drawing Sheets

One sample (best case)
Level 0
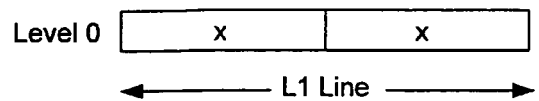
Level 1
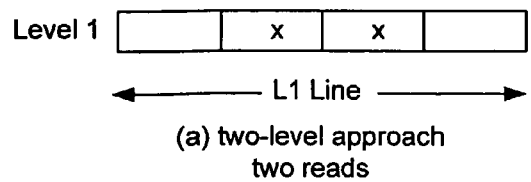
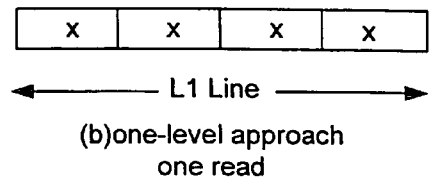
(a) two-level approach
two reads
FIG. 3A
(b) one-level approach
one read
FIG. 3B
One sample (worst case)
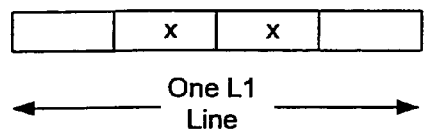
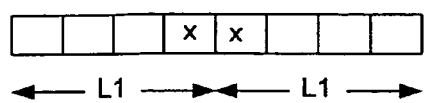
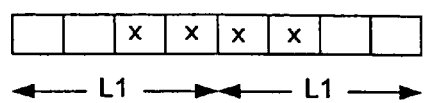
FIG. 4A
FIG. 4B (a) two reads (b) one read 3 reads

8 samples (arbitrary)

3 + 2 reads 3 reads

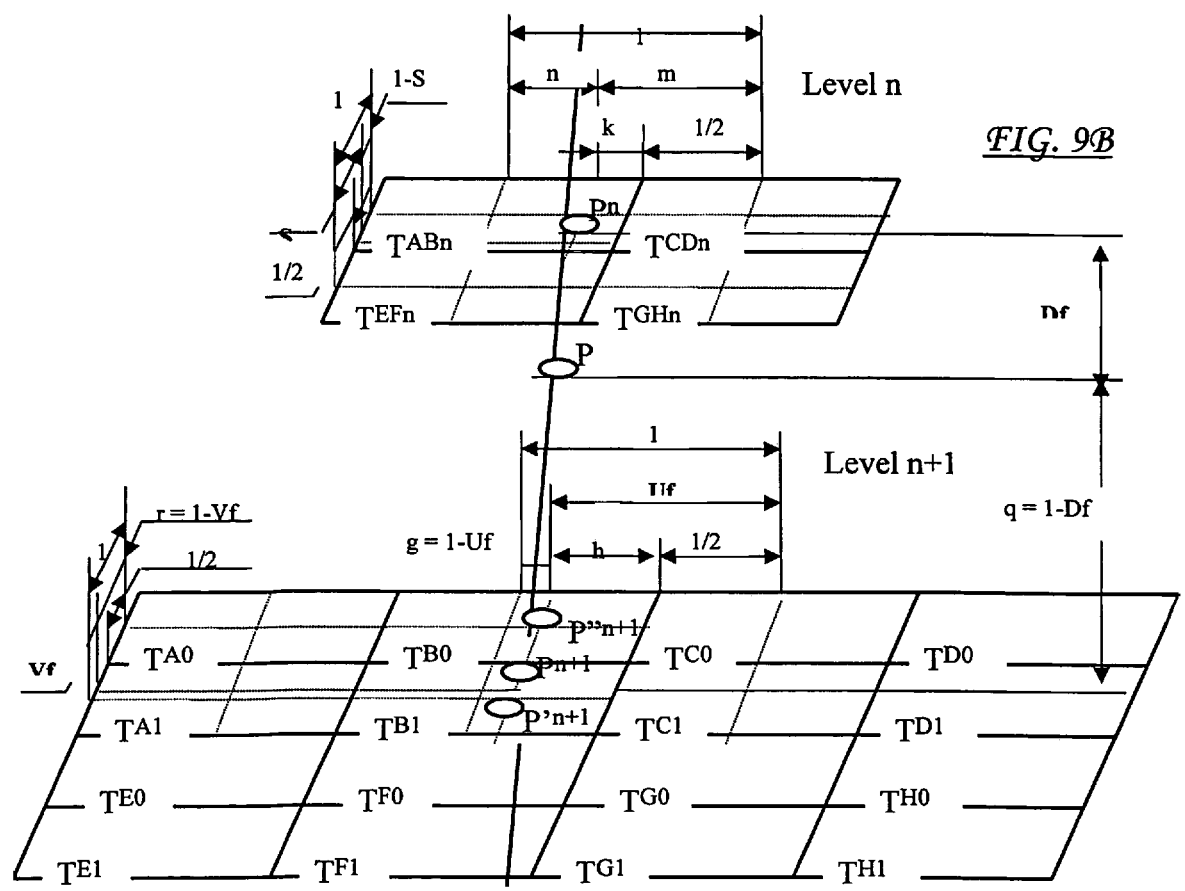

SINGLE LEVEL MIP FILTERING ALGORITHM FOR ANISOTROPIC TEXTURING

CROSS REFERENCE TO RELATED APPLICATION

This application claims priority to U.S. Provisional Application Ser. No. 60/448,956, filed Feb. 21, 2003, and entitled "SINGLE LEVEL MIP FILTERING ALGORITHM FOR ANISOTROPIC TEXTURING," which application is incorporated herein by reference.

FIELD OF THE INVENTION

The present invention relates to generally to texture mapping and more particularly to anisotropic texture mapping methods designed to reduce aliasing effects.

DESCRIPTION OF THE RELATED ART

Access to pixel buffers in a graphics system has opened up new ways of processing graphical images. For example, access to pixel buffers in a graphics system permits direct modification of the pixels to achieve certain effects, such as texturing a surface, without the cost of performing these effects in the geometry engines of the graphics system. In the forward direction, texturing a surface typically involves mapping a given point in a 2-dimensional texture space to the surface of a 3-dimensional object in object space. This step is called parameterization. The object is then projected, in a step called a projective transformation, onto a 2-dimensional display in screen space whose resolution is limited by the pixel buffers used to create the display image. Texturing can also be performed in the reverse direction, called inverse mapping. In inverse mapping, for every pixel in screen space, a pre-image of the pixel in the texture space must be found. A square pixel has, in general, a curvilinear quadrilateral pre-image.

One problem that can occur when performing texture mapping is aliasing. This occurs as a result of the limited resolution of the pixel buffer for the display and the limited size of the texture array that holds the 2-dimensional texture. The limited resolution of the pixel buffer for the display has an inherent spatial sampling frequency and the limited resolution of the texture map has an inherent spatial frequency. If the spatial frequency of the texture map is greater than the spatial sampling frequency inherent in the display pixel buffer, then aliasing can occur.

There are several conditions under which the spatial frequency of the texture map can be greater than the spatial sampling frequency of the display pixel buffer. One condition is that the object being textured is a distant object or is viewed in perspective, thereby reducing the size of the object to a small number of pixels compared with a full-size orthographic view of the object in screen space. Another condition is that the size of a window through which the object is viewed in the display space is small. In either case, aliasing occurs, thereby distorting texture and the upsetting the realism sought to be achieved. It is therefore desirable to minimize aliasing under these and other similar circumstances.

A well-known technique for minimizing aliasing of mapped textures, called mip-mapping, is to provide a series of texture arrays, the highest level texture array in the series having the greatest resolution, and the lowest array in the series having the lowest resolution, with intermediate arrays having intermediate resolutions. Each lower dimension texture map is a filtered version of a next higher dimension of the texture array, so that there are smooth transitions between levels in the series of texture arrays. A key issue in this technique is determining which of the series of texture arrays should be chosen to supply the source of the texture. If a level too high is chosen, then aliasing will result, and if too low a level is chosen an array is chosen, the texture will not show up clearly. The parameter that describes the level chosen is called LOD (Level Of Detail).

Filtering of the lower level of detail texture arrays involves the concept of a footprint or area of support. This is the area over which an average or some other filtering function is computed on the next higher level of detail. A common type of footprint is a circle, which implies that the filtering function is the same in each dimension of a 2-dimensional texture array. Another more general footprint is an ellipse, which implies anisotropy because the major axis is different from the minor axis.

The amount of anisotropy can be quantified by a ratio, $$\frac{\max\left\|\frac{\partial u}{\partial s}, \frac{\partial v}{\partial s}\right\|}{\min\left\|\frac{\partial u}{\partial s}, \frac{\partial v}{\partial s}\right\|},$$

where (u,v) are coordinates in a 2-dimensional texture space, (x,y) are coordinates in the display space, and s=(cos α, sin α), and $$\frac{\partial u}{\partial s} = \frac{\partial u}{\partial x}\cos\alpha + \frac{\partial u}{\partial y}\sin\alpha,$$

as described in U.S. Pat. No. 6,219,064 (Kamen et al.).

As a standard mathematical approach, the footprint of a texture map on a pixel can be derived from the Jacobian matrix $$J = \begin{pmatrix} \frac{\partial u}{\partial x} & \frac{\partial u}{\partial y} \\ \frac{\partial v}{\partial x} & \frac{\partial v}{\partial y} \end{pmatrix}.$$

The footprint is an ellipse where the two axes are in the direction of du/dx, dv/dx and du/dy and dv/dy, respectively. The magnitude of the axes determines the footprint area and shape.

In isotropic filtering, the differences between axes is ignored and the maximum axis is used to calculate the level of detail (LOD). The LOD is computed as d=log$_2$(magnitude of long axis). This results in a poor quality image when the ratio of the two axes is large.

In anisotropic filtering, the differences of the axes is considered. More texels are sampled along the long axis than along the short axis and the LOD is computed as d=log$^2$ (magnitude of short axis). Thus, by applying a proper filter, the resulting texture from multiple texels can faithfully represent the pixel color. If, along the short axis, the footprint covers exactly one texel at a corresponding mip-map level, then only that mip-map level is needed for filtering. However, if the footprint in the short axis direction covers more than just one texel, more samples along the short axis are needed for proper filtering. The current art interpolates between the current mip-map level and next lower resolution mip-map level to obtain the final color of the pixel. However, this requires access to multiple mip-map levels, with an associated performance loss. Access to a second level of the mip-map always costs additional bus transaction cycles which slow down the texture filtering processing. In an efficient cache design, in which one level filtering can be performed in one cycle, additional memory cycles for second level processing reduces the performance of anisotropic filtering by half. The problem manifests itself more when the degree of anisotropy is large. Therefore, it is desirable to generate a high quality textured image when the degree of anisotropy is large, but without incurring a performance loss.

BRIEF SUMMARY OF THE INVENTION

The present invention uses only one level of the mip-map to perform the filtering without regard to the amount of coverage of the footprint of a pixel on the texture. This is done by deriving the next lower-resolution mip-map level from the current level for anisotropic filtering purposes. Using one level instead of two avoids the loading of the next level texels into the cache, which takes an additional memory cycle. In addition, the cache hit rate is improved, because the current level texels has locality of reference.

A method in accordance with the present invention is a method of performing anisotropic mip-mapping. The method includes mapping a target pixel needing texture to one or more texels in a higher resolution texture array, where a region of support in the higher resolution texture array is defined by a long and a short axis, is generally elliptical and a level of detail is derived from the short axis. The method further includes performing a filtering function along an axis using the texels from the higher resolution texture array to simulate a filtering effect of using texels from the higher resolution texture array and a second texel array having a lower resolution. The step of performing a filtering function includes, in one embodiment, using the texels from the higher resolution texture array to derive texels of the lower resolution texture array, interpolating the texels from the higher resolution texture array to form a first blended texel, interpolating the texels from the lower resolution texel array to form a second blended texel, and, interpolating the first blended and second blended texels to arrive at a texture for the target pixel.

One advantage of the present invention is that few texture cache reads are needed for perform a multilevel filtering function.

Another advantage is that a multilevel filtering function can always be performed in the processing of pixels, because no performance loss occurs.

BRIEF DESCRIPTION OF THE DRAWINGS

These and other features, aspects and advantages of the present invention will become better understood with regard to the following description, appended claims, and accompanying drawings where:

FIG. 3A shows the one sample case of reading a cache line (best case) in the prior art;

FIG. 3B shows the one sample case of reading a cache line (best case) in the present invention;

FIG. 4A shows the one sample case of reading a cache line (worst case) in the prior art;

FIG. 4B shows the one sample case of reading a cache line (worst case) in the present invention;

FIG. 9B shows, graphically, the parameters involved for the two dimension case in accordance with the present invention;

DETAILED DESCRIPTION OF THE INVENTION

Figure 1:
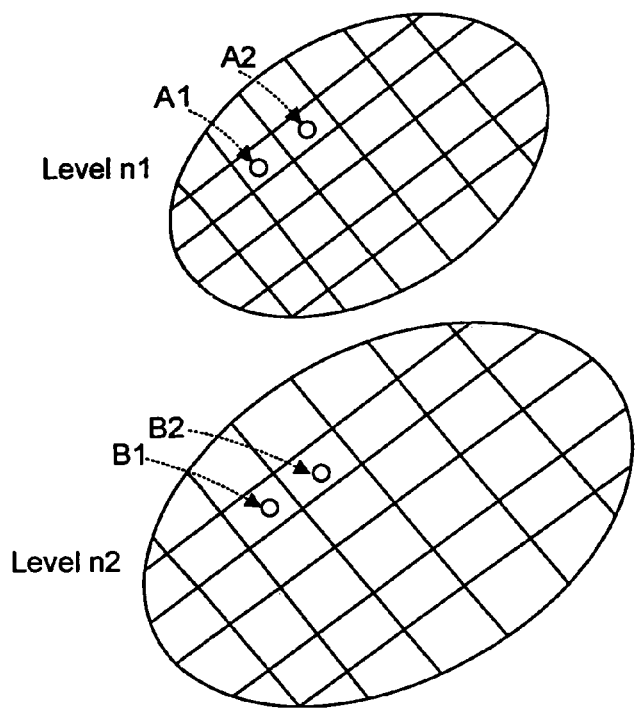
FIG. 1 shows prior art texture mapping.

FIG. 1 shows prior art texture mapping as described in U.S. Pat. No. 6,304,268 (Iourcha) and assigned to S3 Graphics Co. LTD., which patent is hereby incorporated by reference in to the present specification. Level n1 has two samples A1 and A2 and level n2 has two samples B1 and B2. A1 and B1 are blended to produce C1 and A2 and B2 are blended to produce C2. Then C1 and C2 are summed with weights to form the final color.

Figure 2:
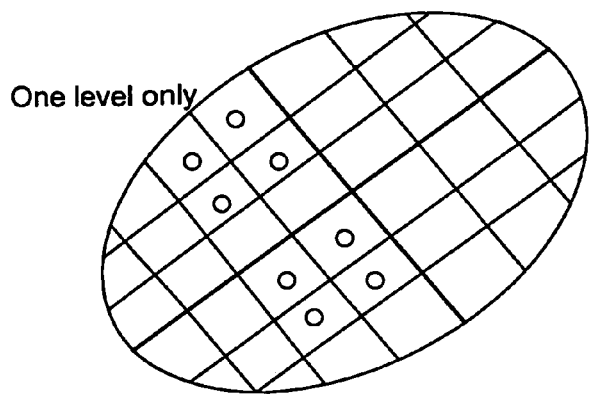
FIG. 2 shows texture mapping in accordance with the present invention.

FIG. 2 shows texture mapping in accordance with the present invention. In FIG. 2 all eight samples in one level are summed with weights to form the final color. Two level mip-maps are not used.

FIG. 3A shows the one sample case of reading a cache line (best case) in the prior art. In FIG. 3A two cache lines are fetched to read the two levels of the mip-map.

FIG. 3B shows the one sample case of reading a cache line (best case) in the present invention. In FIG. 3B, one cache line is fetched to read the single level needed of the mip-map.

FIG. 4A shows the one sample case of reading a cache line (worst case) in the prior art. In FIG. 4A, three cache lines are fetched to obtain the two levels of mip-map needed.

FIG. 4B shows the one sample case of reading a cache line (worst case) in the present invention. In FIG. 4B, two cache lines are fetched for the single level needed.

Figure 5A:
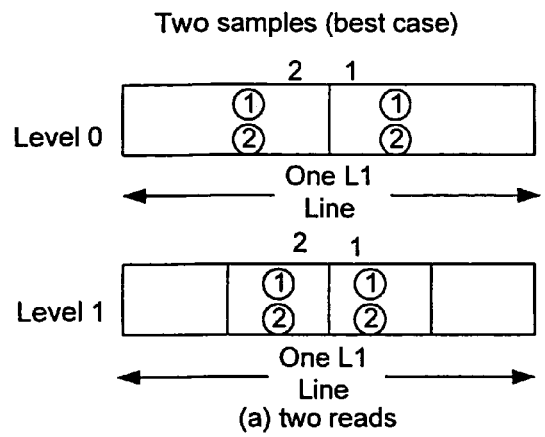
FIG. 5A shows the two samples case of reading a cache line (best case) in the prior art.

FIG. 5A shows the two samples case of reading a cache line (best case) in the prior art. In FIG. 5A, two cache lines are fetched, one for each level.

Figure 5B:
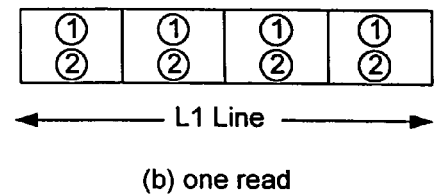
FIG. 5B shows the two samples case of reading a cache line (best case) in the present invention.

FIG. 5B shows the two samples case of reading a cache line (best case) in the present invention. In FIG. 5B, one cache line is fetched for the single needed level.

Figure 6A:
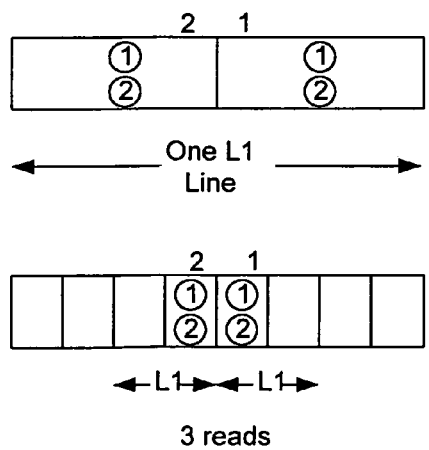
FIG. 6A shows the two samples case of reading a cache line (worst case) in the prior art.

FIG. 6A shows the two samples case of reading a cache line (worst case) in the prior art. In FIG. 6A, three cache lines are fetched to obtain the levels needed.

Figure 6B:
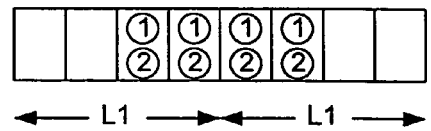
FIG. 6B shows the two samples case of reading a cache line (worst case) in the present invention.

FIG. 6B shows the two samples case of reading a cache line (worst case) in the present invention. In FIG. 6B, two cache lines are fetched for the single level needed.

Figure 7A:
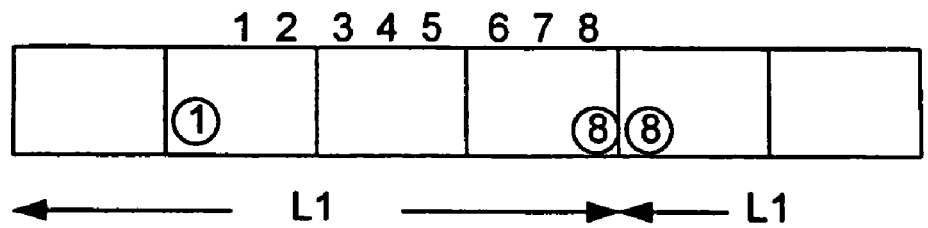
FIG. 7A shows the eight samples case of reading a cache line in the prior art.
Figure 7A:
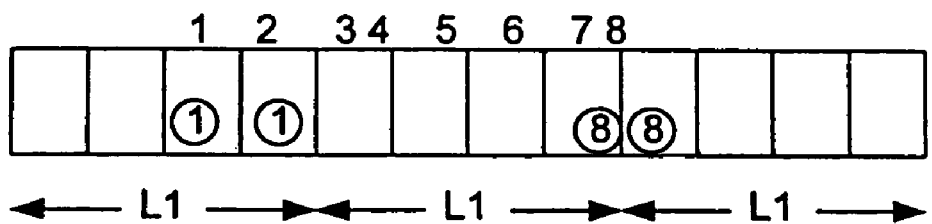

FIG. 7A shows the eight samples case of reading a cache line in the prior art. In FIG. 7A, five cache lines are read to obtain eight samples.

Figure 7B:
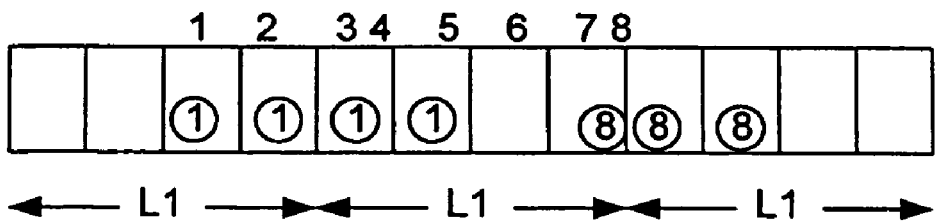
FIG. 7B shows the eight samples case of reading a cache line in the present invention.

FIG. 7B shows the eight samples case of reading a cache line in the present invention. In FIG. 7B, three cache lines are read to obtain the eight samples.

Figure 8:
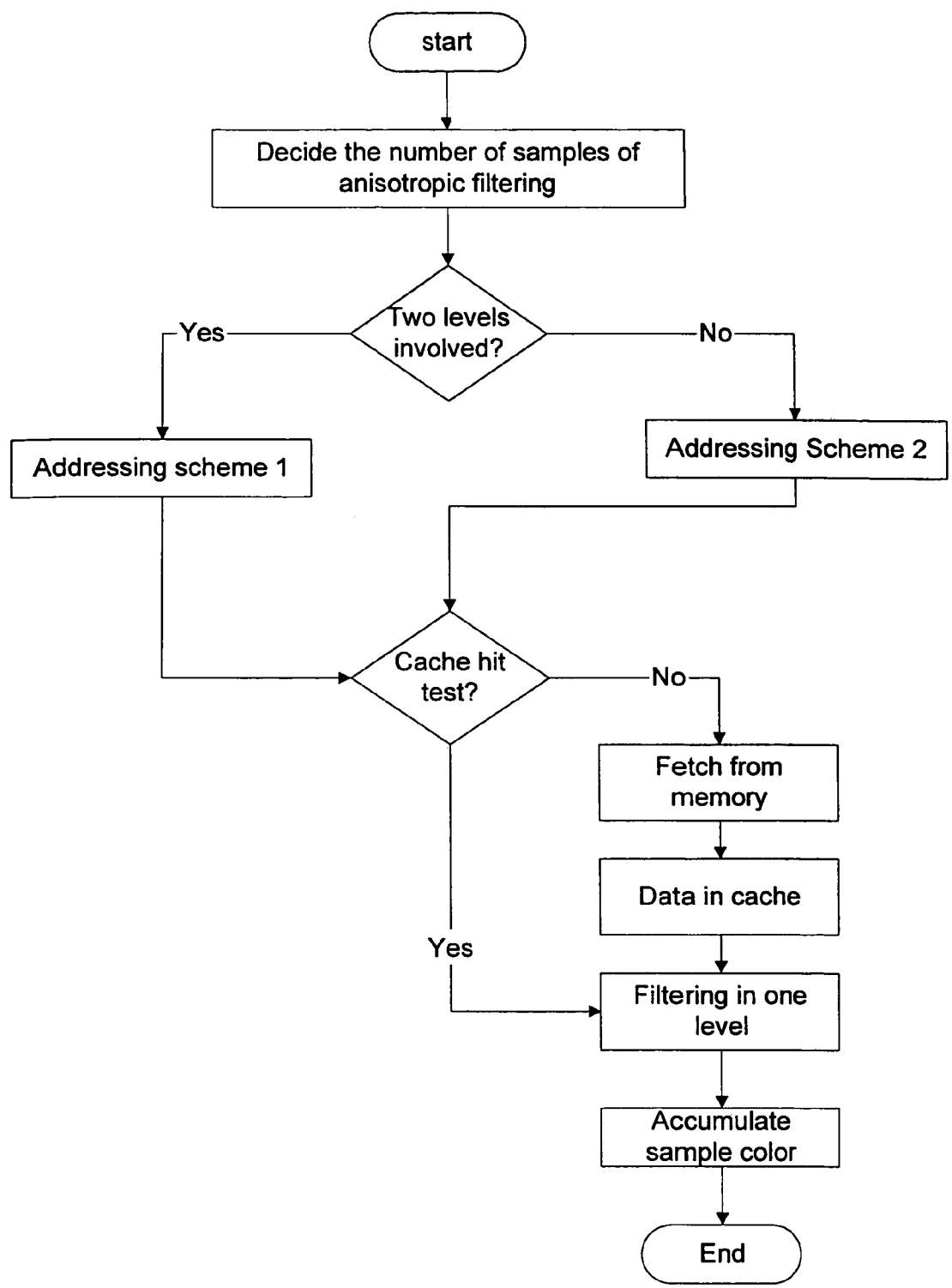
FIG. 8 shows a flow chart of the overall steps in the present invention.

FIG. 8 shows a flow chart of the overall steps in the present invention. If two-level mip-mapping is used, then cache addressing scheme 1 is used and one higher resolution mip-map level is used to simulate two levels of mip-mapping. If two-levels mip-mapping is not used, then addressing scheme 2 is used.

In accordance with the present invention, the formula for filtering 4 texels, in one dimension, is $$\text{final color} = Wa*\text{ColorA} + Wb*\text{ColorB} + Wc*\text{ColorC} + Wd*\text{ColorD},$$

where Wa, Wb, Wc and Wd are the filter weights for each of the colors ColorA, ColorB, ColorC, ColorD of the four texels. The filter weights are:

$$Wa = \tfrac{1}{8}(1-Df)(1+2Uf),$$

$$Wb = Uf*Df + Wa,$$

$$Wc = (1-Uf)*Df + Wd,$$

and $$Wd = \tfrac{1}{8}(1-Df)(3-2Uf)$$

where Uf is the fraction of the U texture coordinate and Df is the fraction of the LOD. For the V coordinate, Uf is replaced with Vf.

Figure 9A:
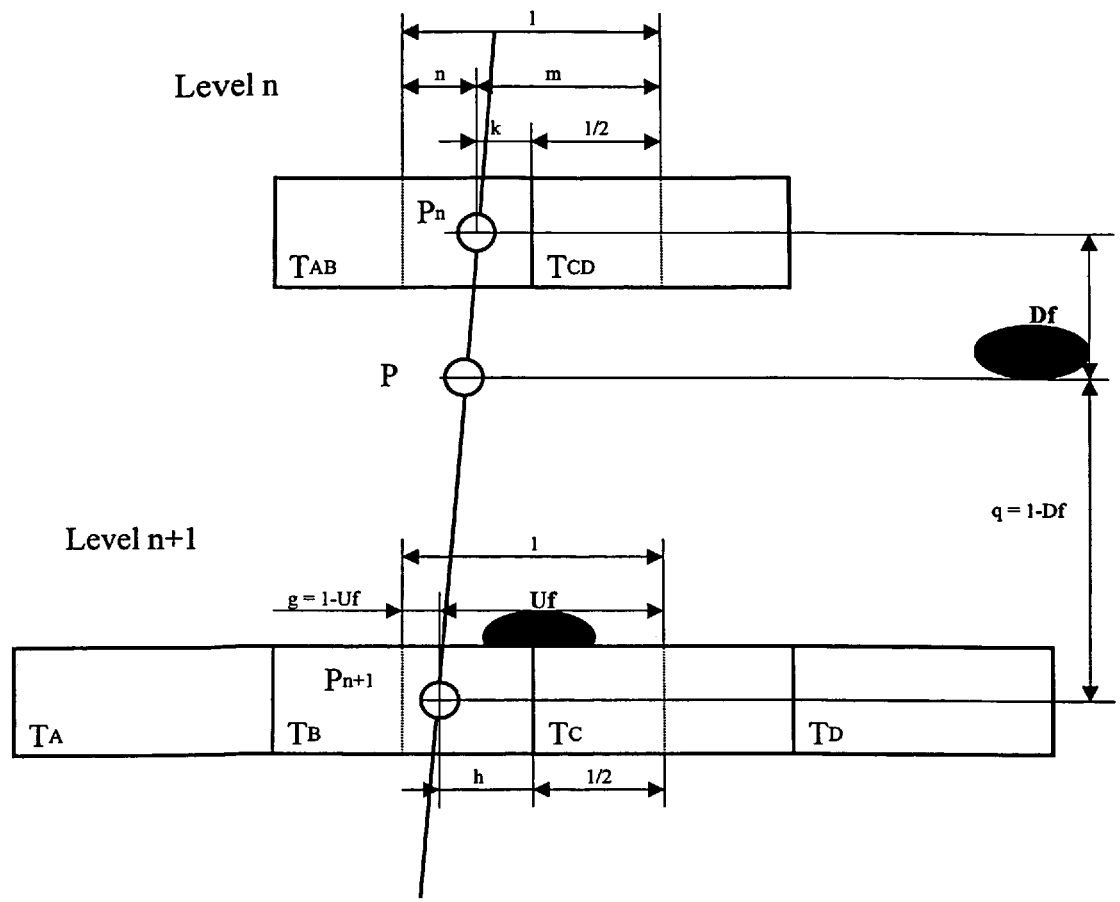
FIG. 9A shows, graphically, the parameters involved for the one dimension case in accordance with the present invention.

FIG. 9A shows, graphically, the parameters involved for the one dimension case in accordance with the present invention. Level n+1 is a higher resolution texel level and level n is a lower resolution texel level. The distance between the levels is unity. An arbitrary pixel P is located at some level between level n+1 and level n. Pixel P's position from the lower resolution level is controlled by parameter Df. Pixel P's position from the higher resolution level is 1−Df. Pixel P maps to a position $P_{n+1}$ in level n+1 and position $P_n$ in level n.

Parameter Uf gives the distance from the center of texel C ($T_c$) to the $P_{n+1}$ position and 1−Uf gives the distance from the center of texel B ($T_B$), where Uf is the fraction of the U texture coordinate and where unity is assumed to be the distance between texel centers. Parameter h gives the distance from the edge of $T_B$ to the position $P_{n+1}$.

Parameter m gives the distance from the center of texel CD ($T_{CD}$) to the $P_n$ position and n=(1−m)=(1−(k+½)) gives the distance from the center of texel AB ($T_{AB}$). Parameter k gives the distance from the edge of $T_{CD}$ to the position $P_n$.

Based on the above, the color at point $P_{n+1}$ is a linear interpolation of the colors at TB and TC, based on position parameter Uf.

$$TP_{n+1} = Uf T_B + (1-Uf) T_C.$$

The color at $P_n$ is a linear interpolation of the colors at $T_{AB}$ and $T_{CD}$ based on position parameter m, $$TP_n = m T_{AB} + (1-m) T_{CD}.$$

The color TP at P is then a linear interpolation of TPn and TPn+1 based on position parameter q between the levels, $$TP = (1-q)TP_{n+1} + q TP_n$$

Substituting the TPn and TPn+1 expressions into TP gives $$TP = (1-q)Uf T_B + (1-q)(1-Uf)T_C + qm T_{AB} + q(1-m)T_{CD}$$

Because only colors TA, TB, TC and TD are available from the cache memory, which stores level n+1, the colors from level n are derived from these colors as follows:

$$T_{AB} = (T_A + T_B)/2$$

$$T_{CD} = (T_C + T_D)/2$$

Therefore, $$TP = (1-q)Uf T_B + (1-q)(1-Uf)T_C + qm(T_A+T_B)/2 + q(1-m)(T_C+T_D)/2.$$

Collecting like terms yields, $$TP = T_A(qm/2) + T_B((1-q)Uf + qm/2) + T_C((1-q)(1-Uf) + q(1-m)/2) + T_D(q(1-m)/2).$$

Therefore, the weights are $$W_a = \tfrac{1}{8} \cdot (1-D_f)(1+2U_f)$$

$$W_b = D_f U_f + W_a,$$

$$W_c = D_f(1-U_f) + W_d,$$

and $$W_d = \tfrac{1}{8} \cdot (1-D_f)(3-2U_f),$$

where the equalities k=h/2, m=(h+1)/2, h=Uf−½, and n=1−m, were used. Note that $$\sum_i W_i = D_f U_f + 2W_a + D_f(1-U_f) + 2W_d = D_f + 2(W_a + W_d).$$

Therefore, $$\sum_i W_i = D_f + \tfrac{1}{4}(1-Df)(4) = 1$$

FIG. 9B shows, graphically, the parameters involved for the two dimension case in accordance with the present invention. Geometry similar to the U dimension is introduced for the V dimension, where Vf gives the position of the texel in the higher resolution texel map. In the two dimensional case, V direction also has four samples, so both U and V dimensions form a 4×4 texel 2D array Wuv. Each one of the 4×4 texels has a corresponding weighting factor taken from the Wuv array. The weighted sum is then the final color for the anisotropic sample. In practice, one can tabulate the weight array Wuv according to the Df, Uf, Vf and a desired filtering function. Below is one of them, when box filtering is assumed (similar to the discussions above for one dimension case):

$$Wuv = Duv * Uuv * Vuv, \ u=0,1,2,3, \ v=0,1,2,3$$

$$Duv = 0.25 * Df, \text{ if either } u=0 \text{ or } 3, \text{ or } v=0, \text{ or } 3,$$
$$(1-0.75) * Df, \text{otherwise}$$

$$Uuv = (1-Uf), \text{ if } u=0 \text{ or } u=1,$$

$$Uuv = Uf, \text{ if } u=2 \text{ or } u=3,$$

$$Vuv = 1 - Vf, \text{ if } v=0 \text{ or } v=1, \text{ and}$$

$$Vuv = Vf, \text{ if } v=2 \text{ or } v=3.$$

The complete Wuv array is set forth below.

$$W_{uv} = \begin{bmatrix} 0.25D_f(1-U_f)(1-V_f) & (1-0.75D_f)(1-U_f)(1-V_f) \\ (1-0.75D_f)(1-U_f)(1-V_f) & (1-0.75D_f)(1-U_f)(1-V_f) \\ (1-0.75D_f)(1-U_f)V_f & (1-0.75D_f)(1-U_f)V_f \\ 0.25D_f(1-U_f)V_f & (1-0.75D_f)(1-U_f)V_f \end{bmatrix}$$

$$\begin{matrix} (1-0.75D_f)U_f(1-V_f) & 0.25D_fU_f(1-V_f) \\ (1-0.75D_f)U_f(1-V_f) & (1-0.75D_f)U_f(1-V_f) \\ (1-0.75D_f)U_fV_f & (1-0.75D_f)U_fV_f \\ (1-0.75D_f)U_fV_f & 0.25D_fU_fV_f \end{matrix}$$

The final color=$\Sigma$(Wuv*Color(u,v)), where u and v each take on values from 0 to 3, and where Color(u,v) is the color (texel) corresponding to Wuv on the read mipmap level. Also please note that $\Sigma W_{uv}=1$, where u=0, 1, 2, 3 and v=0, 1, 2, 3.

In the case of multiple anisotropic samples, the weights of each sample also depend on the anisotropic ratio, and the filter function chosen for the anisotropic case. For example, if the ratio is 3.5, then 4 samples can be chosen. Assuming a box filtering function, then the weight for each anisotropic sample is 0.25. If a Gaussian filtering function is assumed, then the weight for each sample is subject to the function exp(-((x-x0)(x-x0)/ratio*ratio), where x0 is the cluster center of N samples, and x is the location of the sample. The sample weights must be normalized to 1. The sampling point of samples is across the region of anisotropic shape at the long axis.

In general, the equation for anisotropic filtering can be expressed as follows.

$$\text{final color} = \Sigma WS_i * ColorS_i = 1$$

where i takes on values from 1 to the number of samples, $\Sigma WSi=1$ for i from 1 to the number of samples, WSi is a weighting function for the ith sample, and ColorSi is the blended color for the ith sample. The greater the number of samples chosen, the better the quality of the image is, but there is a performance loss. Since only the high resolution mip-map level is sampled, there is a tradeoff between quality and performance.

Generally speaking, in the one dimension case, a single texel in the lower resolution mipmap level is derived from two adjacent texels in the higher resolution mipmap level, and two adjacent texels in the lower resolution mipmap level are derived from four adjacent texels in the higher resolution mipmap level. Because a pixel at an LOD between these two mipmap levels is blended from two adjacent texels in the lower resolution mipmap level and two adjacent texels in the higher resolution mipmap level, such a pixel can therefore be blended from four adjacent texels in the higher resolution mipmap level in accordance with the present invention. Please refer to FIG. 9 and the above equations, in which four adjacent texels of the same mipmap level are used.

In the two dimension case, one texel in the lower resolution mipmap level is derived from four texels in a 2×2 block in the higher resolution mipmap level, and four texels in a 2×2 block in the lower resolution mipmap level are derived from sixteen adjacent texels in a 4×4 block in the higher resolution mipmap level. Because a pixel at an LOD between these two mipmap levels is blended from four texels in the 2×2 block in the lower resolution mipmap level and four texels in the 2×2 block in the higher resolution mipmap level, such a pixel can therefore be blended from sixteen texels in a 4×4 block in the higher resolution mipmap level in accordance with the present invention. This can be understood by referring to the above weight array Wuv, which indicates how sixteen texels of the same mipmap level are used.

Figure 10:
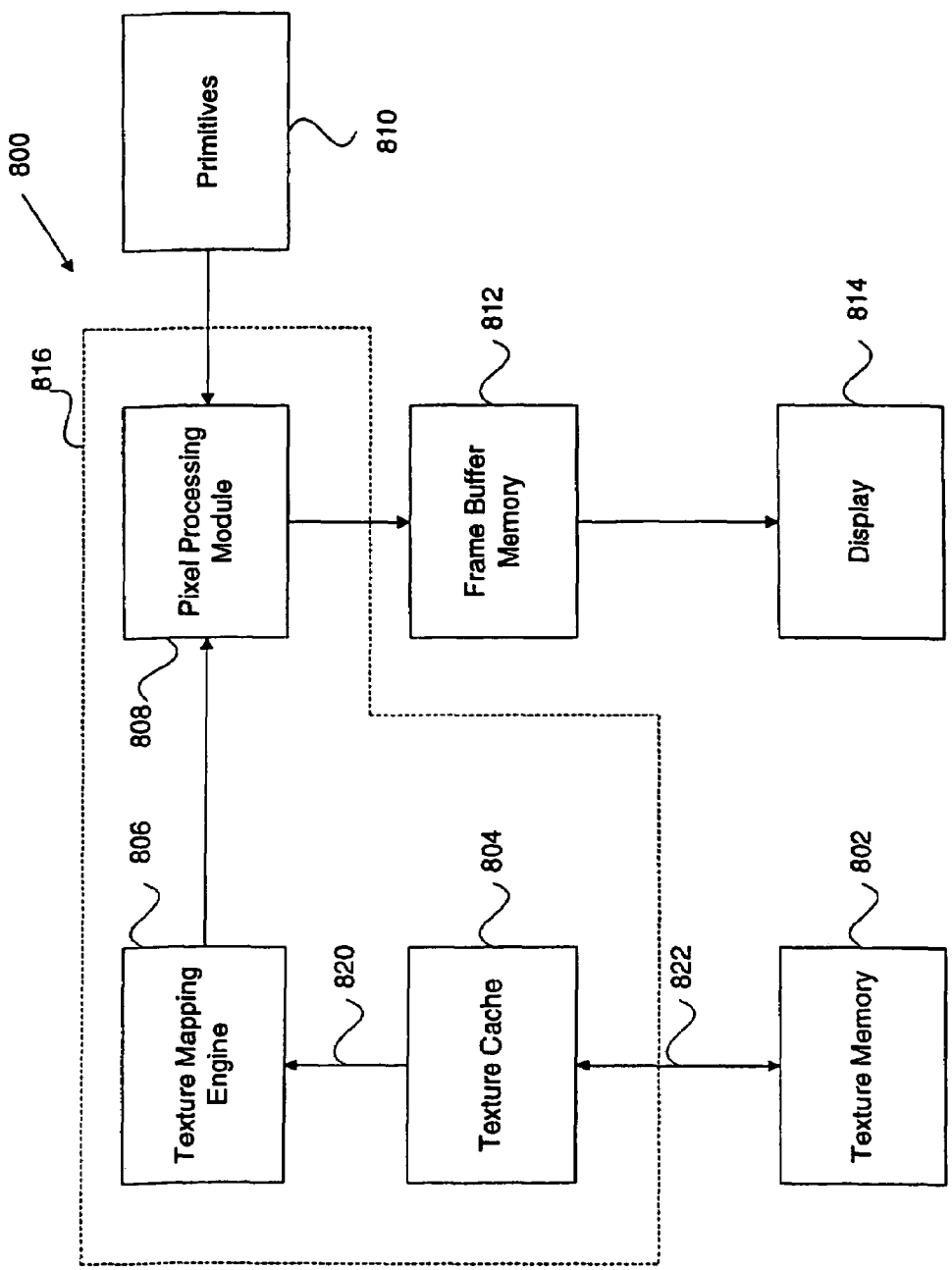
FIG. 10 shows a block diagram of a graphics system for practicing an embodiment of the present invention.

FIG. 10 shows a block diagram of a graphics system for practicing an embodiment of the present invention. System 800 includes a texture memory 802, a texture cache 804, a texture mapping engine 806, a pixel processing module 808, a primitives memory 810, a frame buffer memory 812, and a display device 814. The texture mapping engine, texture cache and pixel processing module are often included on a graphics acceleration chip. The texture memory 802 stores two-dimensional representations of texture to be mapped onto primitives. In the present invention, preferably one level of texture detail is stored. The texture cache 804 provides temporary storage of portions of the texture memory 802. The graphic primitives are preferably stored in a primitives memory 810, which contains information describing the size and shape of graphics elements such as triangles or other polygons to be displayed. The texture mapping engine performs the operation of mapping textures stored in texture memory 802 onto primitives stored in the primitives memory 810. The output of the texture mapping engine 806 is connected to an input of the pixel processing module 808. The pixel processing module performs z-buffering, texture lighting, fogging, alpha-blending, and other pixel operations and writes the resulting rendered image to the frame buffer memory 812. The image in the frame buffer is sent to the display device such as a CRT or LCD panel.

Figure 11:
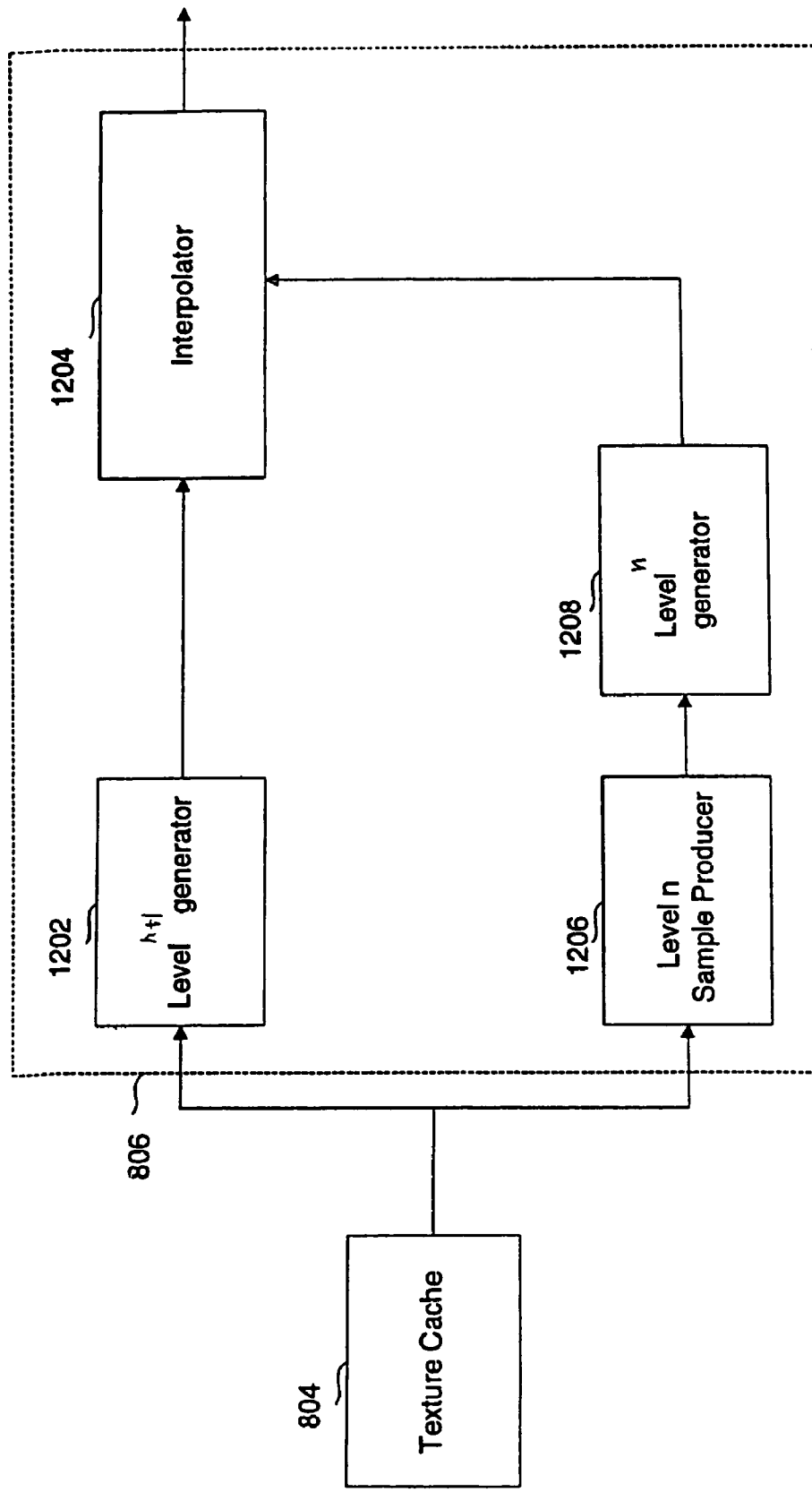
FIG. 11 shows a block diagram of the texture cache and a preferred embodiment of the texture-mapping engine in more detail.

FIG. 11 shows a block diagram of the texture cache and a preferred embodiment of the texture-mapping engine in more detail. The texture mapping engine 806 includes a first level generator 1202, an interpolator 1204, and a sample producer 1206 and a second level generator 1208. The first level generator is coupled to the texture cache 804, and generate a first level of detail n+1. The output of the first level generator 1202 is coupled to a first input of the interpolator 1204 to provide a blended higher resolution texel. The sample producer 1206 is coupled to the texture cache to receive stored texels and produces texels for the next level n of detail. The output of the sample producer 1206 is coupled to in input of the second level generator 1208. The second level generator 1208 uses the lower resolution texels to produce blended lower resolution texel.

The interpolator 1204 generates the final texture value from the blended higher resolution texel and the blended lower resolution texel based on the level of detail (LOD) parameter.

Although the present invention has been described in considerable detail with reference to certain preferred versions thereof, other versions are possible. Therefore, the spirit and scope of the appended claims should not be limited to the description of the preferred versions contained herein.

What is claimed is:

1. A method of reducing the number of texture cache cycles while performing anisotropic mip-mapping, comprising:
    mapping a target pixel needing texture to one or more texels in a higher resolution texture array, a region of support in the higher resolution texture array being defined by a long and a short axis and being generally elliptical and a level of detail being derived only from the short axis; and
    performing a filtering function along an axis using the texels from the higher resolution texture array to simulate a filtering effect of using texels from the higher resolution texture array and a second texel array having a lower resolution, wherein only one level of texture level is stored and used to generate the lower resolution texture array, wherein simulating the filtering effect reduces the number of cache memory cycles associated with the filtering function, wherein the step of performing a filtering function further comprises:
    using the texels from the higher resolution texture array to derive texels of the lower resolution texture array,
    interpolating the texels from the higher resolution texture array to form a first blended texel,
    interpolating the texels from the lower resolution texel array to form a second blended texel, wherein the sum of a first product, $m*T_{AB}$, and a second product, $(1-m) T_{CD}$ is formed, where $m=\frac{1}{2}Uf+\frac{1}{4}$, which indicates a coordinate position of the target pixel in the lower resolution texture array, and $T_{AB}$ and $T_{CD}$ are adjacent texels in the lower resolution array; and
    interpolating the first blended and second blended texels to arrive at a texture for the target pixel.

2. A method of performing anisotropic mip-mapping, as recited in claim 1, wherein the step of using the texels from the higher resolution texture array to derive texels of the lower resolution texture array includes filtering adjacent texels in the higher resolution texture array, based on the mapped position of the target pixel in the higher resolution texture array, to derive texels in the lower resolution texel array.

3. A method of performing anisotropic mip-mapping, as recited in claim 2, wherein four adjacent texels in the higher resolution array are used to derive two adjacent texels in the lower resolution array.

4. A method of performing anisotropic mip-mapping, as recited in claim 3, wherein an adjacent pair of texels in the higher resolution array is filtered to provide a single texel in the lower resolution array.

5. A method of performing an isotropic mip-mapping, as recited in claim 1, wherein the step of using the texels from the higher resolution texture array to derive texels of the lower resolution texture array includes averaging adjacent texels in the higher resolution texture array, based on the mapped position of the target pixel in the higher resolution texture array, to derive texels in the lower resolution texel array.

6. A method of performing anisotropic mip-mapping, as recited in claim 1, wherein the step of interpolating the texels from the higher resolution texture array to form a first blended texel includes bilinearly interpolating adjacent texels based on the mapped position of the target pixel in the higher resolution texture array.

7. A method of performing anisotropic mip-mapping, as recited in claim 6, wherein a selected texel to which the target pixel is mapped and an adjacent texel are interpolated based on the position of the target pixel in the selected texel.

8. A method of performing anisotropic mip-mapping, as recited in claim 1, wherein the step of interpolating the texels from the higher resolution texture array to form a first blended texel includes forming the sum of a first product, $Uf*T_B$, and a second product, $(1-Uf)T_C$, where Uf indicates a coordinate position of the target pixel in the higher resolution texture array, and $T_B$ and $T_C$ are adjacent textures in the higher resolution array.

9. A method of performing anisotropic mip-mapping, as recited in claim 1, wherein the step of interpolating the texels from the lower resolution texel array to form a second blended texel includes bilinearly interpolating adjacent texels based on the mapped position of the target pixel in the lower resolution texture array.

10. A method of performing an isotropic mip-mapping, as recited in claim 8, wherein a selected texel to which the target pixel is mapped and an adjacent texel are interpolated based on the position of the target pixel in the selected texel.

11. A method of performing anisotropic mip-mapping, as recited in claim 1, wherein the step of interpolating the first blended and second blended texels to arrive at a texture for the target pixel includes bilinearly interpolating the first and second blended texels, based on a parameter that indicates the level of detail between and including the texels of the higher and lower resolution arrays.

12. A method of performing anisotropic mip-mapping, as recited in claim 1, wherein the step of interpolating the first blended and second blended texels to arrive at a texture for the target pixel includes forming the sum of a first product, (Df)*the first blended texel, and the second product, (1−Df) *the second blended texel, where Df is the parameter indicating the level of detail, wherein, when Df is 0, the level of detail corresponds to the lower resolution texture array, and when Df=1, the level of detail corresponds to the higher resolution texture array.

13. A method of performing anisotropic mip-mapping, as recited in claim 1, wherein a first number of textures are sampled in a first direction in the higher resolution array and a second number of texels are sampled in a second direction in the higher resolution array to form first blended pixels in the first direction and first blended pixels in the second direction, and to form second blended pixels in the first direction and second blended pixels in the second direction, said first number being different from said second number.

14. A method of performing anisotropic mip-mapping, as recited in claim 1, wherein the target pixel color is blended according to the following function, target pixel color=□WSi*ColorSi, for i from 1 to the number of samples, wherein □WSi=1, for i from 1 to the number of samples, and WSi is a weighting function for the ith sample, and ColorSi is the blended color for the ith sample.

15. A method of performing anisotropic mip-mapping, as recited in claim 14, wherein the blended color ColorSi of the ith sample is blended according to the following function, ColorSi=ΣWuv*Color(u,v), for u from 0 to 3, and v from 0 to 3, for the ith sample, wherein Color(u,v) is a color corresponding to Wuv on the same mipmap level, ΣWuv=1, for u from 0 to 3, and v from 0 to 3, and Wuv is a weight coefficient for said Color(u,v).

16. A method of performing an isotropic mip-mapping, as recited in claim 15, wherein the weight coefficients are elements of a weight coefficient array, $$W_{uv} = \begin{bmatrix} 0.25D_f(1-U_f)(1-V_f) & (1-0.75D_f)(1-U_f)(1-V_f) \\ (1-0.75D_f)(1-U_f)(1-V_f) & (1-0.75D_f)(1-U_f)(1-V_f) \\ (1-0.75D_f)(1-U_f)V_f & (1-0.75D_f)(1-U_f)V_f \\ 0.25D_f(1-U_f)V_f & (1-0.75D_f)(1-U_f)V_f \end{bmatrix}$$

-continued
$$\begin{matrix} (1-0.75D_f)U_f(1-V_f) & 0.25D_fU_f(1-V_f) \\ (1-0.75D_f)U_f(1-V_f) & (1-0.75D_f)U_f(1-V_f) \\ (1-0.75D_f)U_fV_f & (1-0.75D_f)U_fV_f \\ (1-0.75D_f)U_fV_f & 0.25D_fU_fV_f \end{matrix},$$

where $U_f$, $V_f$ are position parameters in direction u and v, respectively, and $D_f$ is a fraction value of the level of detail.

* * * * *